March 7, 1944.                A. W. NELSON                2,343,570
CHUCKING DEVICES FOR USE IN SCREW AND SIMILAR MACHINES
Filed Jan. 19, 1942

Witness
Charles T. Olson

Inventor
Alden W. Nelson
by Fish Hildreth
Cary & Jenney atty

Patented Mar. 7, 1944

2,343,570

UNITED STATES PATENT OFFICE 2,343,570

CHUCKING DEVICE FOR USE IN SCREW AND SIMILAR MACHINES

Alden W. Nelson, Pawtucket, R. I., assignor to Brown and Sharpe Manufacturing Company, a corporation of Rhode Island Application January 19, 1942, Serial No. 427,256

9 Claims. (Cl. 29—62)

The present invention relates to improvements in chucking devices adapted for use in screw and similar machines, in which bar stock is supported for rotation and is given a stepped advancing movement to bring successive portions thereof into operative relation with the fashioning tools.

The invention is herein disclosed in a preferred form as embodied in the work spindle assembly of an automatic screw machine comprising a feed collet with feed fingers which are reciprocated axially to advance the bar, and a rotating chuck with jaws which are alternately clamped against the bar, and are released to permit the feeding of the bar. Under certain conditions of operation in machines of this type, difficulty has been experienced in causing the work spindle to properly dispose of or to control the waste end of a bar of stock used up in the machine until such time as the machine is attended to by the operator. It has been found, for example, when the waste end of the feeding bar has passed out of the control of the feed fingers, but is still held in the jaws of the chuck, that there is a tendency of the waste end to be vibrated out of position when the jaws of the chuck are open, with resulting damage or breakage of parts during continued operation of the machine in accordance with its automatic cycle.

It is a principal object of the invention to provide a novel holding device which will cooperate with the jaws of the chuck in a work spindle assembly of this general description, to support the waste end of a bar feeding in the machine against inadvertent axial shifting movement for a condition in which the chuck jaws are released for the feeding operation, and in which the trailing end of the bar has passed from the control of the feed fingers.

More specifically, it is an object of the invention to provide for use in the work spindle assembly of an assembly of an automatic screw or similar machine, a novel and improved friction holding device to prevent inadvertent axial movement of bar stock through the jaws of the chuck, which is readily assembled with standard operating parts of such machines, is simple and inexpensive in construction, and is well adapted for the performance of its function without any tendency to injure or mar the surface of the feeding bar.

Figure 1:
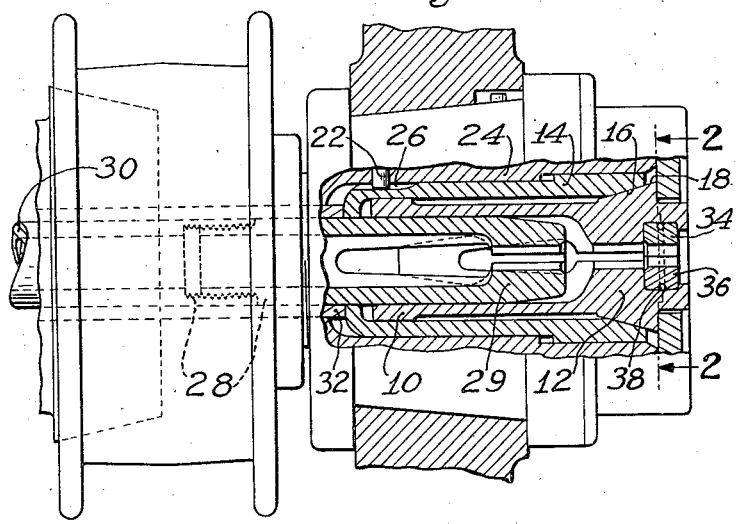
Figure 2:
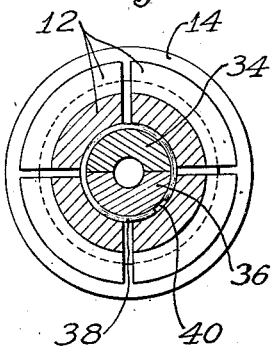
Figure 3:
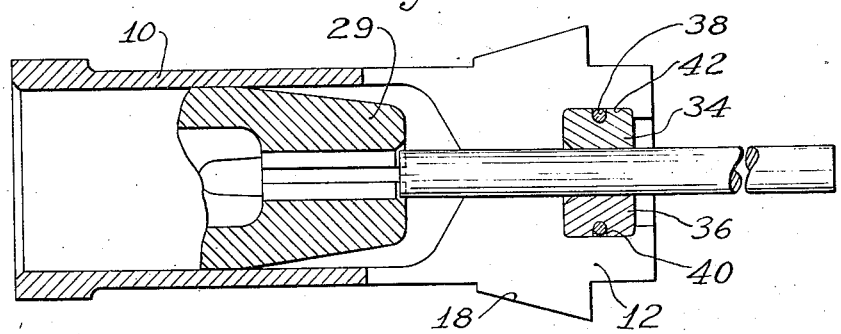
Figure 4:
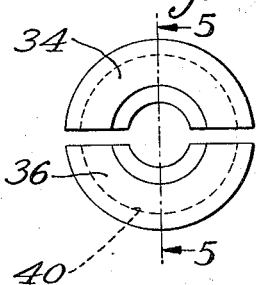
Figure 5:
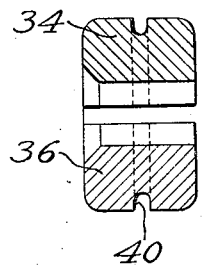
Figure 6:
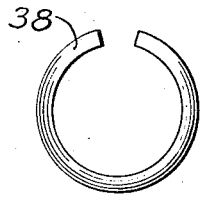

With these and other objects in view as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawing, in which Fig. 1 is a view in side elevation, partly in section, of the work spindle assembly of an automatic screw machine, so much of the spindle being shown as is necessary to illustrate the connection of the invention therewith; Fig. 2 is a sectional view taken on the line 2—2 of Fig. 1; Fig. 3 is an enlarged detail view illustrating particularly the feed fingers, chuck and holding device with a waste end of stock supported by the chuck and holding device; Fig. 4 is an end view of the two semi-circular members forming applicant's ring friction holding device; Fig. 5 is a sectional view taken on the line 5—5 of Fig. 4; and Fig. 6 is a detail view of the wire spring element for frictioning the sections of the ring holding device against the bar of stock.

In Fig. 1 of the drawing, there is shown the work spindle of an automatic screw machine which is set up for the manufacture of small parts, such as watch staffs. The work spindle illustrated is of standard construction, and comprises a chuck 10 in the form of a sleeve member having four segmental bar gripping jaws 12 and a chuck closing sleeve 14 which is slidably supported upon the chuck member 10 and is provided with a conical clutch closing surface 16 for engagement with corresponding rise surfaces 18 on the chuck jaws 12. The chuck closing sleeve 14 is keyed to turn with the spindle assembly by means of a pin 22 in a driving sleeve 24 which engages with a slot 26 in the chuck closing sleeve 14. For feeding the work, there is provided the usual feed finger unit 28 including feed fingers 29, which is secured to the forward end of an axially reciprocable feed tube 30. The chuck closing sleeve 14 is advanced axially to force the jaws 12 into gripping engagement with the work by means of a chuck closing tube 32 sleeved on the feed tube 30, and arranged at one end to abut against the flanged rear end of the chuck closing sleeve 14.

During operation of the machine in accordance with its automatic cycle to feed the work, the feed collet with feed fingers 29 is retracted, and the chuck closing sleeve 14 is permitted also to move rearwardly to release the pressure of the chuck jaws 12 on the bar of stock. The feed collet with feed fingers 29 is then moved forward to feed the bar, and the chuck closing sleeve 14 is also moved forwardly, acting by its engagement with the rise surfaces 18 to bring the chuck jaws 12 into gripping engagement with the bar preparatory for the forming of another article. During the normal operation of the machine, the bar stock is at all times frictionally engaged by the feed fingers 29, and is further engaged and supported during each fashioning operation by the gripping engagement of the chuck jaws 12. It will readily be seen, however, that as the bar of stock is used up, the trailing end thereof will move out of engagement with the feed fingers 29 to some such position as shown, for example, in Fig. 3, so that as the chuck jaws 12 are again opened, the waste end of the bar is loosely held in the chuck jaws substantially out of control.

Under the conditions of operation encountered in adapting an automatic screw machine for the manufacturing of watch staffs, in which small stock is used and a relatively large proportion of the waste end is left projecting from the chuck, creating an unbalanced condition thereof, the waste end tends to vibrate or creep axially in a forward direction so that when the jaws again close during the continued automatic operation of the machine, the waste end will project beyond the normal position to which it would have been fed by the feed fingers 29, with resultant damage to or breakage of tools or other parts. In order to avoid this difficulty, applicant has provided a novel, effective, and at the same time extremely simple contractible friction ring holding device which cooperates with the jaws 12 of the chuck to resist and to check any inadvertent axial movement of the waste end while the jaws are in their open or released position.

Applicant's holding device comprises specifically two semi-circular friction ring segments 34 and 36 which frictionally engage opposite sides of the bar of stock passing therethrough, and a spring member 38 which is mounted in a peripheral groove 40 in the ring segments 34, 36, and tends to force these parts toward one another to maintain a frictional engagement of the ring segments 34, 36, with the peripheral surface of the bar. The friction ring holding device consisting of the ring segments 34 and 36 and spring 38 is supported loosely in an annular groove 42 formed in the inner periphery of the chuck jaws 12. The diameter of the groove 42 is determined with relation to the inner and outer diameters of the friction ring segments 34, 36, so that the jaws 12 are free to be moved to their closed bar engaging position without affecting the position or operation of the friction holding device.

In operation, applicant's improved holding device operates to maintain a continuous frictional resistance to any axial movement of the feeding bar through the chuck, this resistance, however, having no effect upon the control of the feeding bar except at such time when the trailing end of the bar has passed out of the control of the feed collet, leaving only the waste end in the chuck. With the present construction, the amount of the frictional resistance applied is independent of the operation of the chuck in opening and closing, and is capable of accurate adjustment through the employment of a spring tensioning element 38 of known strength. Notable features of applicant's improved holding device will include the contractible ring type of construction which provides for frictional engagement of the feeding bar by the device substantially around the entire periphery of the bar, and the annular groove in the clutch jaws for loosely supporting the holding device, which is permitted to rotate freely with the feeding bar, and is thus enabled to maintain a frictional resistance to axial movement of the bar so balanced as to reduce to a minimum any tendency of the rotating waste end to vibrate out of position after it has passed beyond the control of the feed fingers. Applicant's device does not tend to scratch or otherwise mar the surface of the feeding bar, a matter of considerable importance where the feeding bar stock is sized to provide one of the diameters of the finished article.

It will be understood that the invention is not limited to the specific embodiment shown, and that various deviations may be made therefrom without departing from the spirit and scope of the appended claims.

What is claimed is:

1. For use in the work spindle assembly of an automatic screw or similar machine, a chuck having jaws operable to alternately grip and release a bar of stock, an annular supporting groove formed within said jaws, and a contractible ring friction holding device supported within said groove for engagement with the bar and comprising a plurality of friction ring segments and spring means for contracting said segments against the bar of stock.

2. For use in the work spindle assembly of an automatic screw or similar machine, a chuck having jaws operable to alternately grip and release a bar of stock, an annular supporting groove formed within said jaws, and a contractible ring frictional holding device supported within said recess for engagement with the bar, said device comprising a plurality of ring segments and spring means for contracting said segments inwardly, said ring device having the external diameter thereof small with respect to the diameter of the supporting groove for a position in which said device and jaws are engaged against a bar of stock whereby the operation of the jaws and holding device are rendered independent of one another.

3. For use in the work spindle assembly of an automatic screw or similar machine having a chuck with jaws operable to alternately grip and release a bar of stock, a contractible ring friction holding device supported within the chuck jaws for continuous frictional engagement with substantially the portion of the bar engaged by the chuck jaws and comprising a contractible segmented ring having a groove formed in the periphery thereof, and a contracting spring element supported in said groove.

4. For use in the work spindle assembly of an automatic screw or similar machine, a chuck with jaws operable to alternately grip and release a bar of stock and with an annular groove formed in the gripping face of said jaws, and a contractible ring friction holding device loosely supported in said groove for continuous frictional engagement with the bar.

5. For use in the work spindle assembly of automatic screw and similar machines adapted for imparting rotational and feeding movements to bar stock, a chuck having jaws operable to alternately grip and release bar stock, a friction holding device for engagement with the bar stock, and means for supporting said holding device within the bar stock engaging area of the chuck jaws, said holding device being constructed and arranged for continuous engagement with the bar stock to frictionally resist axial movement of the bar stock while permitting free rotation thereof within the chuck jaws.

6. For use in the work spindle assembly of automatic screw and similar machines adapted for imparting rotational and feeding movements to bar stock, a chuck having jaws operable to alternately grip and release bar stock, and a friction holding device having continuous frictional engagement with the bar stock, said holding device being supported rotatably and against axial movement within the chuck jaws whereby the frictional holding device is effective to resist axial movement of the bar stock while the chuck jaws are in the release position.

7. For use in the work spindle assembly of automatic screw and similar machines adapted for imparting rotational and feeding movements to bar stock, a chuck having jaws operable to alternately grip and release bar stock, a friction holding device having continuous frictional engagement with the bar stock, and means for supporting said holding device rotatably and against axial movement, said holding device being located for engagement with a portion of the bar stock substantially within the area of gripping contact of the chuck.

8. For use in the work spindle assembly of automatic screw and similar machines adapted for imparting rotational and feeding movements to bar stock, a chuck having jaws operable to alternately grip and release bar stock, a contractible ring friction holding device for engagement with the bar of stock, and means for supporting said holding device rotatably and against axial movement substantially within the area of gripping contact with the chuck jaws.

9. For use in the work spindle assembly of an automatic screw or similar machine adapted for imparting rotational and feeding movements to bar stock, the combination with a chuck having jaws operable to alternately grip and release the bar stock, of a friction holding device having continuous frictional engagement with the bar stock, said holding device being located in a fixed position axially substantially within the area of gripping contact of the chuck jaws, and arranged to be freely rotatable with the bar stock.

ALDEN W. NELSON.